United States Patent

[11] 3,612,879

| [72] | Inventor | Claes Thomas Ohman<br>Taby, Sweden |
|---|---|---|
| [21] | Appl. No. | 881,128 |
| [22] | Filed | Dec. 1, 1969 |
| [45] | Patented | Oct. 12, 1971 |
| [73] | Assignee | AGA Aktiebolag<br>Lidingo, Sweden |
| [32] | Priority | Nov. 29, 1968 |
| [33] |  | Sweden |
| [31] |  | 16281/68 |

[54] INFRARED SCANNER WITH REFERENCE HEAT SOURCE MOUNTED PERIPHERALLY OF ROTATIONAL OPTICAL SYSTEM
5 Claims, 2 Drawing Figs.

[52] U.S. Cl. .................................................. 250/83.3 H,
250/234, 250/236
[51] Int. Cl. ...................................................... H01j 3/00
[50] Field of Search............................................. 250/83.3 H,
83.3 HP, 234, 236

[56] References Cited
UNITED STATES PATENTS
3,350,562 10/1967 Flint............................ 250/83.3 H

*Primary Examiner*—Archie R. Borchelt
*Attorney*—Larson, Taylor and Hinds

ABSTRACT: A line scanner for infrared radiation includes a rotatable unit including an optical system which transmits received radiation to an infrared detector during a scanning period determined by an aperture in the wall of a housing for the unit. A reference heat source in the form of a metallic plate is mounted on the interior wall of the housing peripherally of the rotatable unit so that the radiation produced thereby passes through the entire optical system during scanning by the system.

INVENTOR
CLAES T. ÖHMAN

BY *Larson and Taylor*
ATTORNEYS

INFRARED SCANNER WITH REFERENCE HEAT SOURCE MOUNTED PERIPHERALLY OF ROTATIONAL OPTICAL SYSTEM

FIELD OF THE INVENTION

The present invention relates to infrared line scanners and, more particularly, to infrared line scanners of the type wherein a reference heat source is provided.

BACKGROUND OF THE INVENTION

Scanning devices for infrared radiation are used extensively in the investigation of the temperature distribution within a particular area. These systems characteristically include an optical system for receiving or collecting infrared radiation (heat), the system being scanned over an area of interest through means of an oscillating or rotating member. The received radiation is applied to an infrared detector.

In order to provide a temperature reference in such a system, a reflector is inserted at an intermediate point in the optical path of the scanner to cause the detector to respond to a reference heat source. The disadvantage of this approach is that the radiation from the reference heat source passes through only a portion of the optical system of the scanner, rather than through the entire optical system as does the scanned or test radiation, so that an erroneous reference standard may be produced.

SUMMARY OF THE INVENTION

In accordance with the present invention an infrared scanner is provided wherein the reference heat source is mounted peripherally of the optical system of the scanner so that the reference radiation produced by the source passes through the entire optical system in the same manner as does the scanned or test radiation.

In accordance with a presently preferred embodiment of the invention a scanning system is provided which includes an optical system for receiving infrared radiation in the direction of an optical axis thereof and for transmitting received radiation to an infrared detector, and rotatable means for imparting a rotating motion to said optical system to cause a scanning movement of said optical axis, infrared radiation from the test area being transmitted to the detector during a predetermined scanning range of the optical system. A reference heat source is, as stated, mounted peripherally of the optical system and outside of the scanning range so that radiation from the reference source passes through the entire optical system.

The scanning range is preferably determined by an aperture in a housing for the optical system and the heat source is preferably mounted on an inner wall of the housing at the same level as the aperture. The reference heat source may conveniently comprise a metallic plate.

Other features and advantages of the invention will be set forth in or apparent from the detailed description of a presently preferred embodiment thereof found hereinbelow.

DESCRIPTION OF A PREFERRED EMBODIMENT

Figure 1:
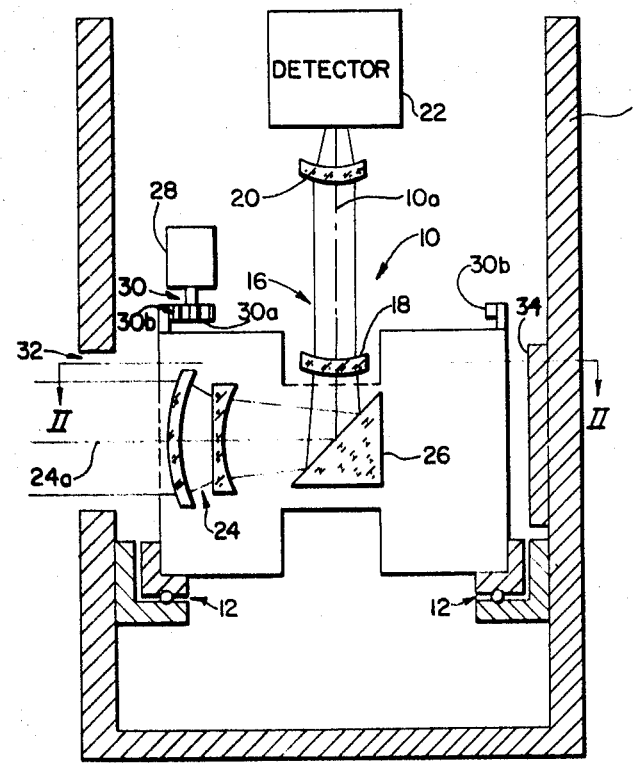
FIG. 1 is a schematic side elevational view, partially in section, of a presently preferred embodiment of the invention.

Referring to FIG. 1, a line scanner incorporating the invention is shown which includes a rotatable optical unit 10 mounted for rotation in bearings 12 within a cylindrical housing 14. The axis of rotation of unit 10 which is denoted 10 $a$ coincides with the optical axis of a portion of an optical system which is generally denoted 16 and which includes a collimating lens 18 and a focusing lens 20 for focusing the received radiation onto an infrared detector 22.

The optical system 16 additionally includes a further portion formed by an objective lens arrangement 24 having an optical axis 24 $a$, and a prism 26. Infrared light received along axis 24 $a$ is deflected by prism 26 along the direction of axis 10 $a$ to detector 22.

Figure 2:
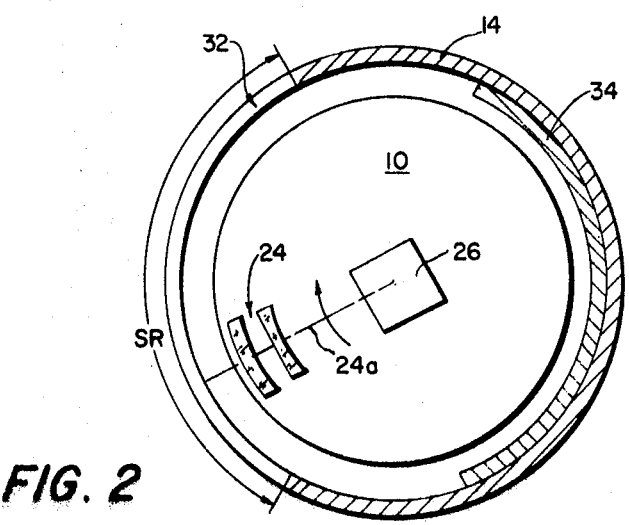
FIG. 2 is a section view taken generally along line II—II of FIG. 1.

Unit 10 is driven by a motor 28 coupled to unit 10 through a gearing arrangement denoted 30 which may comprise a simple motor-driven pinion 30 $a$ in engagement with a ring gear 30 $b$ mounted on the upper surface of unit 10. Motor 28 imparts a rotary scanning motion to unit 10 and thus to optical axis 24 $a$. The effective infrared scanning range denoted SR (see FIG. 2) is defined by an aperture 32 in the wall of housing 14.

In accordance with the invention a reference heat source 34 is mounted peripherally of unit 10 and outside of scanning range SR. The reference heat source 34 takes the form of a metallic plate which is preferably copper and is secured to an interior wall of housing 14. Heat source plate 34 is arcuate in cross section to conform to the contour of the housing wall and is positioned oppositely to aperture 32 at the same level within housing 10.

Considering the operation of the scanner described herein above, upon rotation of unit 10 radiation will alternately be received from reference source 34 and the scanned area within scanning range SR. Because reference source 34 is located peripherally of the entire optical system 16 radiation therefrom will pass through the entire system to detector 22 in the same way as does radiation from the scanned area.

It will be appreciated that the system of the present invention eliminates errors such as occur in systems discussed hereinabove wherein the reference radiation passes through only a portion of the optical system. Thus, for example, where radiation source 34 was located at a level between focusing lens 20 and collimating lens 18 and a reflecting surface was inserted in the optical path between these two lenses so that the heat radiation from radiation source 34 would pass to detector 22, the radiation from source 34 would not pass through optical elements 18, 20 and 24 and thus would not provide a true reference.

Although the invention has been described in detail with particular reference to a preferred embodiment thereof, it will be understood that variations and modifications can be effected within the spirit and scope of the invention as described hereinabove and as defined in the appended claims.

I claim:

1. An infrared scanning system comprising a detector responsive to infrared radiation, an optical system for receiving infrared radiation in the direction of an optical axis thereof, and for transmitting received radiation to said detector, rotatable means for imparting a rotating motion to said optical system to cause a scanning movement of said optical axis, means for limiting the portion of the scanning movement of said system during which infrared radiation is received from an area of interest to a predetermined scanning range, and a reference heat source mounted peripherally of said optical system and outside of said scanning range so that radiation from said reference source passes through the entire said optical system for a portion of said scanning movement outside of said scanning range.

2. A scanning system as claimed in claim 1 wherein said rotatable means comprises rotatable unit, said system further comprising a housing in which said unit is mounted, said housing having an aperture therein for defining said scanning range.

3. A scanning system as claimed in claim 2 wherein said reference heat source comprises a metallic plate mounted on an inside wall of said housing.

4. A scanning system as claimed in claim 3 wherein said housing is cylindrical and said plate is arcuate in cross section and is mounted opposite said aperture, said optical axis extending radially from the axis of rotation of said unit.

5. A scanning system as claimed in claim 4 wherein said plate is constructed of copper.